US012120154B2

(12) United States Patent
Mahajan et al.

(10) Patent No.: US 12,120,154 B2
(45) Date of Patent: *Oct. 15, 2024

(54) FILTERING VIDEO CONTENT ITEMS

(71) Applicant: Rovi Guides, Inc., San Jose, CA (US)

(72) Inventors: Nishchit Mahajan, Bangalore (IN); Nainika Aggarwal, Bengaluru (IN); Dennis Anthony Varkey, Muvattupuzha (IN); Ankur Anil Aher, Maharashtra (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,333

(22) Filed: May 22, 2023

(65) Prior Publication Data

US 2023/0291772 A1 Sep. 14, 2023

Related U.S. Application Data

(63) Continuation of application No. 16/523,781, filed on Jul. 26, 2019, now Pat. No. 11,695,807.

(51) Int. Cl.
*H04L 65/1059* (2022.01)
*G06F 16/735* (2019.01)
*G06F 16/783* (2019.01)
*G06F 18/22* (2023.01)
*G06V 10/75* (2022.01)
(Continued)

(52) U.S. Cl.
CPC ........ *H04L 65/1059* (2013.01); *G06F 16/735* (2019.01); *G06F 16/7837* (2019.01); *G06F 18/22* (2023.01); *G06V 10/75* (2022.01); *G06V 20/46* (2022.01); *G06V 20/48* (2022.01); *H04L 65/60* (2013.01); *H04L 67/1097* (2013.01)

(58) Field of Classification Search
CPC . H04L 65/1059; H04L 65/60; H04L 67/1097; H04L 65/612; H04L 65/764; G06F 16/735; G06F 16/7837; G06F 18/22; G06V 10/75; G06V 20/46; G06V 20/48
USPC ........................................................ 707/754
See application file for complete search history.

(56) References Cited

U.S. PATENT DOCUMENTS

| 8,185,448 B1 | 5/2012 | Myslinski |
| 10,916,006 B2 | 2/2021 | Huang et al. |
| (Continued) | | |

FOREIGN PATENT DOCUMENTS

JP 2009130485 A 6/2009

OTHER PUBLICATIONS

Full English language computer translation of JP 2009-130485 (2009), including abstract, description, and claims (from espacenet, accessed Jan. 30, 2023; 20 pages).

(Continued)

*Primary Examiner* — Loi H Tran
(74) *Attorney, Agent, or Firm* — Haley Guiliano LLP

(57) ABSTRACT

Methods and systems for filtering video content items are described herein. The system identifies a plurality of video content items that are linked to respective image content items. The system determines, for each of the plurality of video content items, whether a video content item corresponds to a respective image content item. In response to the determining, the system causes to be provided information identifying the plurality of video content items excluding video content items that do not correspond to respective image content items.

16 Claims, 7 Drawing Sheets

(51) Int. Cl.
*G06V 20/40* (2022.01)
*H04L 65/60* (2022.01)
*H04L 67/1097* (2022.01)

(56) References Cited

U.S. PATENT DOCUMENTS

| | | |
|---|---|---|
| 11,695,807 B2 | 7/2023 | Mahajan et al. |
| 11,700,285 B2 | 7/2023 | Mahajan et al. |
| 2003/0026457 A1 | 2/2003 | Nahum |
| 2010/0211584 A1* | 8/2010 | Wang .................. G06F 16/70 707/758 |
| 2017/0372142 A1* | 12/2017 | Bilobrov ............ H04N 21/2187 |
| 2018/0004855 A1* | 1/2018 | Bolshinsky ........... G06F 40/134 |
| 2018/0192101 A1 | 7/2018 | Bilobrov |
| 2020/0202071 A1 | 6/2020 | Ghulati |
| 2020/0279030 A1 | 9/2020 | Vanblon et al. |
| 2021/0004398 A1* | 1/2021 | Chiarandini ..... H04N 21/26603 |
| 2021/0026884 A1 | 1/2021 | Mahajan et al. |
| 2021/0026885 A1 | 1/2021 | Mahajan et al. |
| 2021/0126945 A1 | 4/2021 | Muto et al. |

OTHER PUBLICATIONS

NPL Search (Year: 2023).

\* cited by examiner

FILTERING VIDEO CONTENT ITEMS

CROSS-REFERENCE TO RELATED APPLICATION

This application is a continuation of U.S. patent application Ser. No. 16/523,781, filed Jul. 26, 2019, the disclosure of which is incorporated by reference in its entirety.

BACKGROUND

The present disclosure is directed to filtering video content items and, more particularly, to excluding or verifying video content items based on whether the content of the video corresponds to an image content item linked to the video.

SUMMARY

Systems and methods are described herein for filtering video content items. Video content items may be represented on a display, for example, as image content items, textual descriptions including video length, size, keywords, tags, sources, titles, any other textual description, or any combination thereof, animated images, video snippets, any other suitable content, or any combination thereof. In some embodiments, the linked image content items are not representative of the video content item. For example, the system may have relied on metadata or other data that was used in the process of retrieving the video content items to identify these erroneous results. This data may have been generated, for example, to cause the video content item to be identified as a result more often, even when not relevant. Sometimes, the displayed results may be otherwise manipulated to entice a user to select a particular item in order to have them access content that they were not necessarily interested in (e.g., advertising). Such misleading results are sometimes referred to as "clickbait." Clickbait can lead to frustrating content consumption experiences when the user must click through various misleading content items in order to identify a legitimate content item of interest. Systems and methods are needed which differentiate clickbait content items from legitimate content items.

The present disclosure addresses the problems described above by verifying the veracity of video content items based on the correspondence of the video content items to the respective image content items. Any suitable technique may be applied for determining correspondence between a video content and its linked image content item. For example, the system may require that the image content item must include at least a portion of a frame of the video content item. In some embodiments, the system may require that the image content item must refer to the same subject as the video content item. In some embodiments, the system may require that each object in the image content item appear in the same frame of the video content item. In some embodiments, the system may simply require that the image content item and video content item refer to related subject matter. In some embodiments, the system may use any other technique for determining correspondence of a video content item and respective image content item, or any suitable combination thereof.

For those video content items that cannot be verified as corresponding to the linked image content items, the system prevents the user's experience from being adversely affected by potentially misleading content items.

One technique is to exclude from a list of content items any video content items which do not correspond to respective image content items. This technique ensures that users are not exposed to misleading content items and that these items do not clutter the users' displays.

Another technique is to provide indicators that make it clear which video content items correspond to the linked image content items and which do not correspond. In some embodiments, the system may include indicators with video content items that have failed verification. For example, the misleading results are presented with an indicator that indicate the questionable nature of the underlying video. In some embodiments, the indicator may be an icon, notification, label, change in appearance of the information identifying the video content item, another indication of failed verification, or any combination thereof. For example, the misleading results are shown grayed out or translucent relative to the legitimate results. In some embodiments, the system may include indicators with video content items that have been verified. For example, the indicator may be an icon, notification, label, change in appearance of the information identifying the video content item, another indication of verification, or any combination thereof. In some embodiments, the system may provide indicators with both video content items that have been verified and video content items that have failed verification.

In the following disclosure, the video content items are presented as search results. The search result embodiment is merely illustrative, and video content items can be provided in any other suitable context. For example, video content items are provided in response to a search query, as a list of recommended content items, as advertising content, in response to another trigger, or any combination thereof. In some embodiments, video content items may be retrieved as needed or may be stored for later display. The following disclosure is provided in the context of search results for brevity and clarity.

It should be noted that the systems and methods described herein for one embodiment may be combined with other embodiments as discussed herein.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems are described herein for filtering video content items based on whether the video content of each video content item corresponds to its respective content description. A content description may be an image content item, e.g., a thumbnail image. Filtering involves verifying the results and performing an appropriate action to highlight the results that are more legitimate. In some embodiments, the system may exclude misleading results in order to highlight the legitimate results. In some embodiments, the system may provide indicators of the misleading content items, legitimate content items, or both, in order to highlight the legitimate content items.

Figure 1:
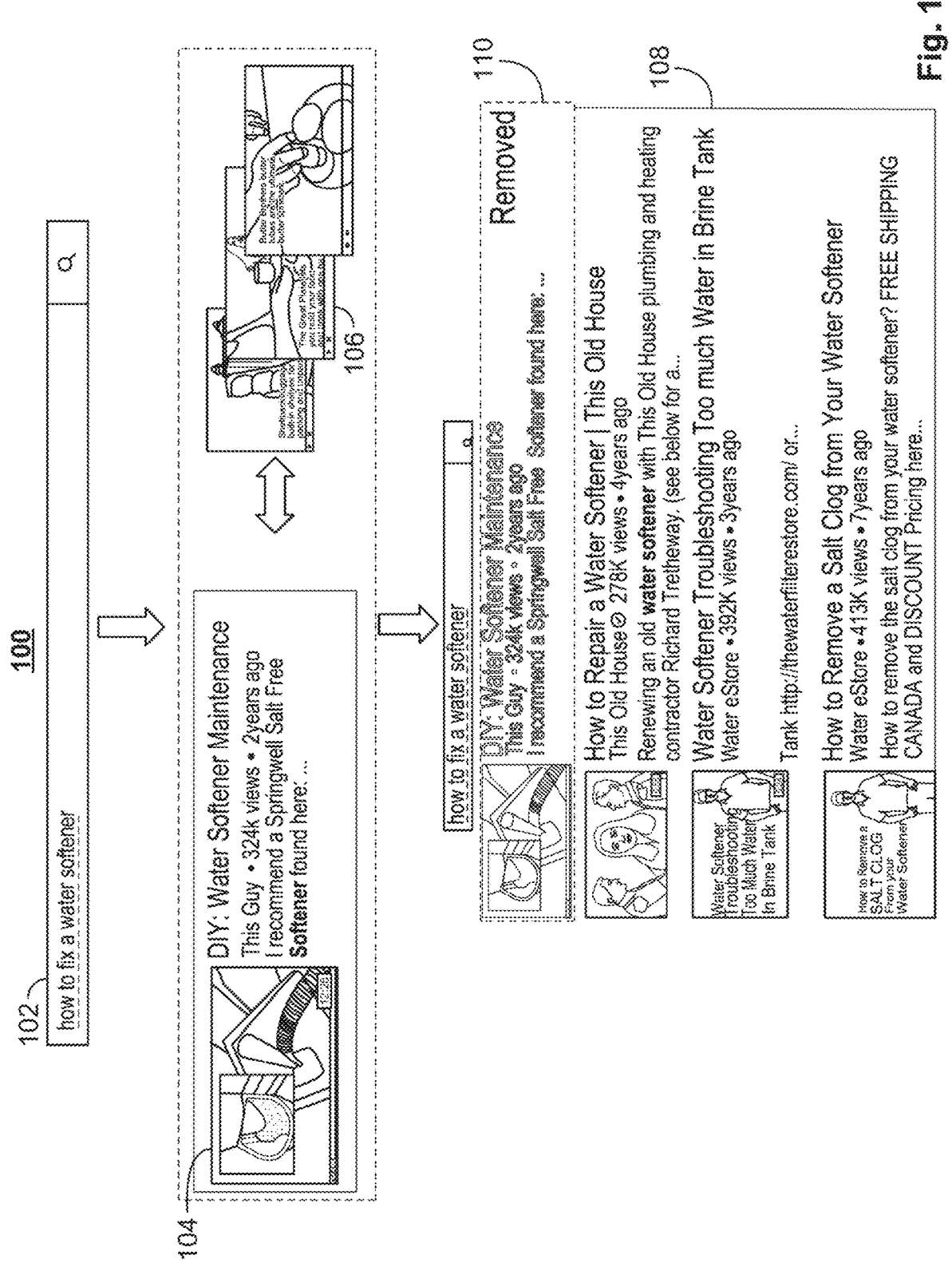
FIG. 1 shows an illustrative example of excluding, from video search results, a video result which does comprise related subject matter with a respective thumbnail, in accordance with some embodiments of the disclosure.

FIG. 1 shows an illustrative example 100 of excluding, from video search results, a video result which does include related subject matter with a linked thumbnail, in accordance with some embodiments of the disclosure. In FIG. 1, control circuitry 404 receives an input 102 which requests video results related to "how to fix a water softener." The system may identify video results which match the input 102. In some embodiments, the system may identify the matching video results based on keywords, metadata, object recognition, frame analysis, other known search techniques, or any combination thereof. In FIG. 1, the system returns results list 108 which includes a plurality of relevant video results, including video result 110. The system identifies thumbnails to which each of the video results is linked. In FIG. 1, the video result 110 is linked to thumbnail (i.e., thumbnail 104). The thumbnails may include representative images, embedded images, thumbnails, textual descriptions, animations, URLs, any other suitable content that is seemingly descriptive of the underlying video content, or any combination thereof. The video result may be linked to the thumbnail via metadata, tags, or hyperlink, by being stored in the same location as the video result, by being embedded in the display of the video result, by any other method of linking, or any suitable combination thereof.

In some embodiments, the system then compares each video result to a linked thumbnail to determine correspondence. In FIG. 1, the system performs a comparison between thumbnail 104 and frames 106 of video result 110. The system may use any techniques to analyze and compare the thumbnail and frames, such as frame comparison, object recognition, image analysis, any other form of image comparison, or any combination thereof. Through this analysis, the system may determine whether the video result and linked thumbnail both depict a particular subject, include at least a portion of the same frame, depict related subject matter, or any combination thereof. In FIG. 1, the system may determine that thumbnail 104 includes a picture of a water softener; however, the frames 106 include a series of advertisements for unrelated products. Based on the comparison, the system may determine that the thumbnail 104 and the frames 106 do not depict related subject matter. Therefore, the system may exclude video result 110 from the results list 108.

In some embodiments, the system may present video results that do not correspond to linked thumbnails in a manner that indicates that the thumbnails are misleading. For example, in some embodiments the misleading results are shown grayed out or translucent relative to the legitimate results. In some embodiments, the misleading results are presented with an indicator that indicate the questionable nature of the underlying video whereas the legitimate results are not presented with such an indicator. In some embodiments, the system may generate for display a pop-up, notification, or alert to indicate that a video result has been excluded from the results list. In some embodiments, the system may simply exclude the video result from the results list.

Figure 2:
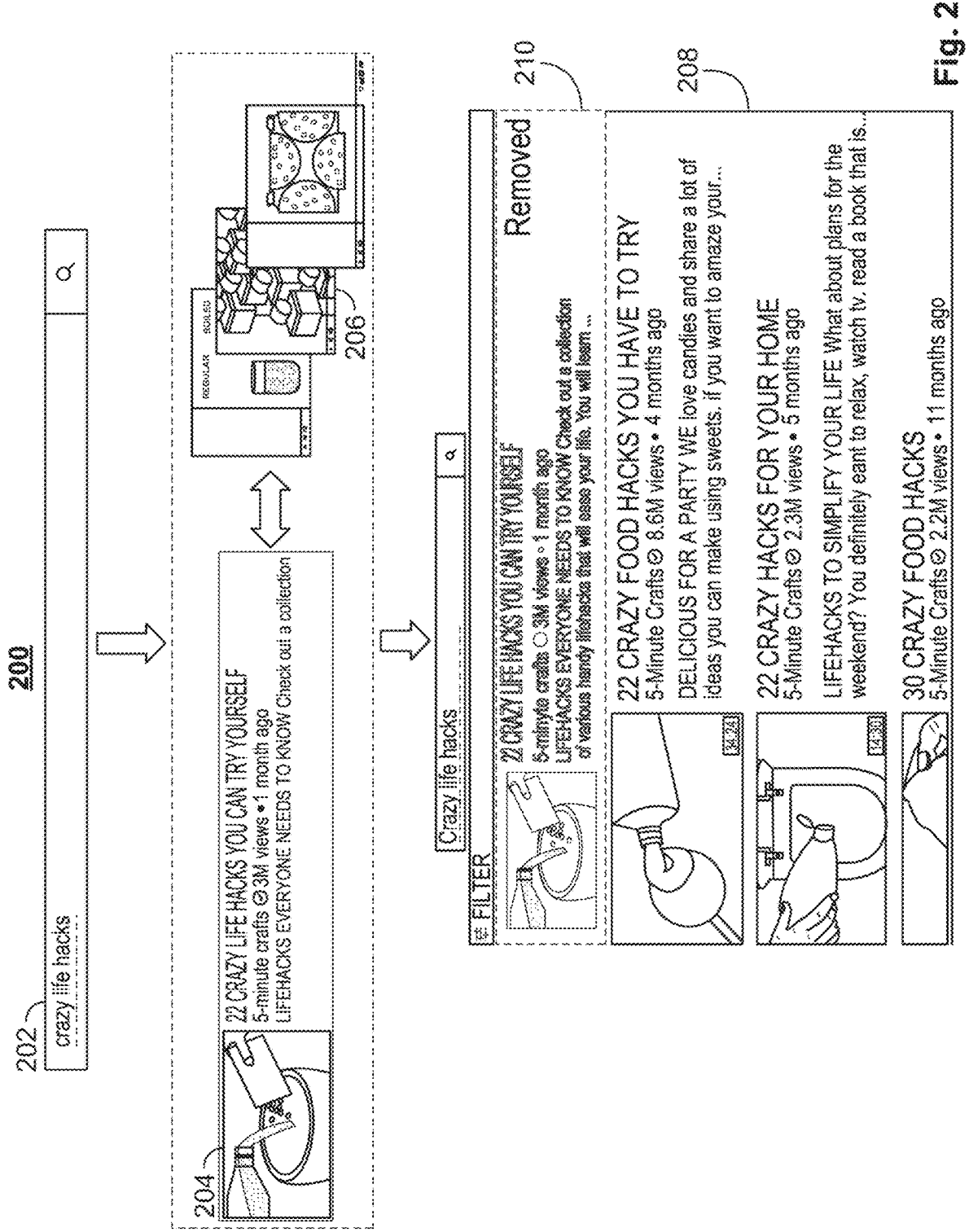
FIG. 2 shows an illustrative example of excluding, from video search results, a video result which does not comprise the same subject as a respective thumbnail, in accordance with some embodiments of the disclosure.

FIG. 2 shows an illustrative example 200 of excluding, from video search results, a video result which does not include the same subject as a linked thumbnail, in accordance with some embodiments of the disclosure. In FIG. 2, control circuitry 404 receives an input 202 which requests video results related to "Crazy life hacks." The system may identify video results which match the input 202. The system returns results list 208 which includes a plurality of relevant video results, including video result 210. The system identifies the thumbnail (i.e., thumbnail 204) to which video result 210 is linked.

In some embodiments, the system then compares each video result to a linked thumbnail to determine correspondence. In FIG. 2, the system performs a comparison between thumbnail 204 and frames 206 of video result 210. The system may determine that thumbnail 204 includes a picture which contains Coca Cola, Skittles, and a watermelon. The frames 206 include various sodas, candies, and foods. However, none of the frames include Coca Cola, Skittles, or watermelon. Based on the comparison, the system may determine that the thumbnail 204 and the frames 206 do not depict the same subject. Therefore, the system may exclude video result 210 from the results list 208.

In some embodiments, the system may use an assortment of requirements when determining whether to exclude a video result from a results list. For example, the system may require that the thumbnail must include at least a portion of a frame of the video result. In some embodiments, the system may require that the thumbnail must refers to the same subject (e.g., a water softener or a watermelon) as the video result. In some embodiments, the system may require that each object in the thumbnail must appear in the same frame of the video result (e.g., Coca Cola, Skittles, and a watermelon must all appear in the same frame). In some embodiments, the system may simply require that the thumbnail and video result refer to related subject matter. In some embodiments, the system may allow the user to specify the required correspondence between the thumbnail and video result.

Figure 3:
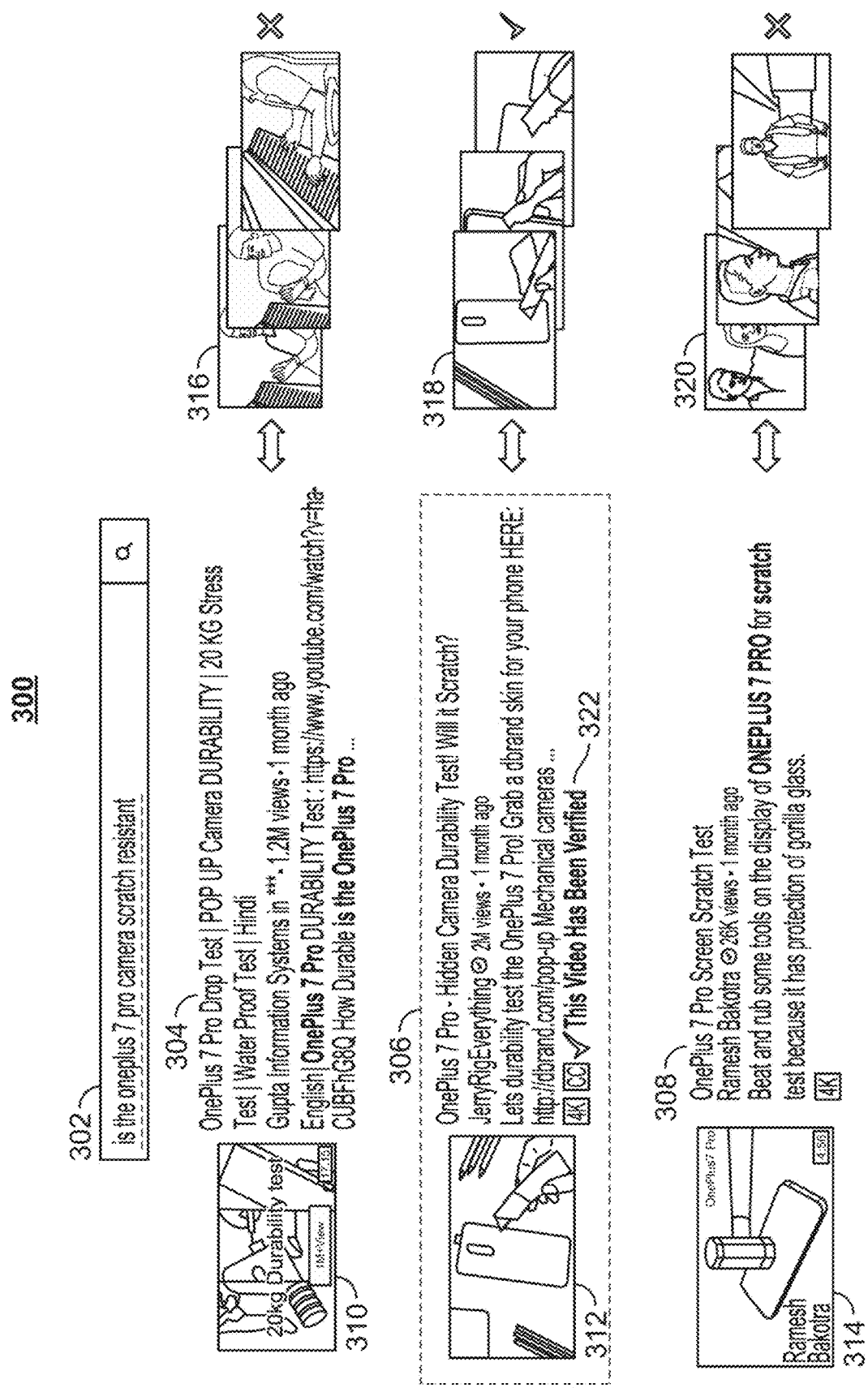
FIG. 3 shows an illustrative example of the display of a verification indicator with a video result which corresponds to a respective thumbnail, in accordance with some embodiments of the present disclosure.

FIG. 3 shows an illustrative example 300 of the display of a verification indicator with a video result which corresponds to a linked thumbnail, in accordance with some embodiments of the present disclosure. In FIG. 3, control circuitry 404 receives an input 302 which requests video results related to "is the OnePlus 7 Pro camera scratch resistant." The system may identify video results which match the input 302. The system returns a results list which includes a plurality of relevant video results, including video results 304, 306, and 308. The system identifies the thumbnails (i.e., thumbnails 310, 312, and 314) to which video results 304, 306, and 308, respectively, are linked.

In some embodiments, the system then compares each video result to the linked thumbnail to determine correspondence. For example, the system performs a comparison between thumbnail 310 and frames 316, thumbnail 312 and frames 318, and thumbnail 314 and frames 320. In the first comparison, the system may determine that thumbnail 310 depicts a camera whereas frames 316 depict a person playing piano. Therefore, the system may determine that the thumbnail does not correspond to video result 304. In the second comparison, the system may determine that thumbnail 312 depicts a camera, hands, and a blade. Frames 318 also depict hands, a camera and a blade. Furthermore, one of the frames 318 is an exact match to thumbnail 312. Therefore, the system may determine that the thumbnail corresponds to the video result and may therefore provide an indication (e.g., indicator 322) that the thumbnail corresponds to the video result. In some embodiments, the indication may include an icon, notification, label, change in appearance of the information identifying the video result, another indication of verification, or any combination thereof. The third comparison between thumbnail 314 and frames 320, like the first comparison, results in a determination that the thumbnail does not correspond to the video result. In some embodiments, the system may cause to be provided an indication of the video results for which the linked thumbnail does not correspond. For example, the indication may include an icon, notification, label, change in appearance of the information identifying the video result, another indication of verification, or any combination thereof.

In some embodiments, the system may distinguish between various subjects and subject matters using, for example, object recognition, any suitable machine vision technique, audio and semantic processing technique, metadata and other embedded data, any other suitable technique, or any combination thereof.

It will be understood that FIGS. 1-3 are shown for illustrative purposes and that not all of the features need to be included. In some embodiments, additional features may be included as well.

Figure 4:
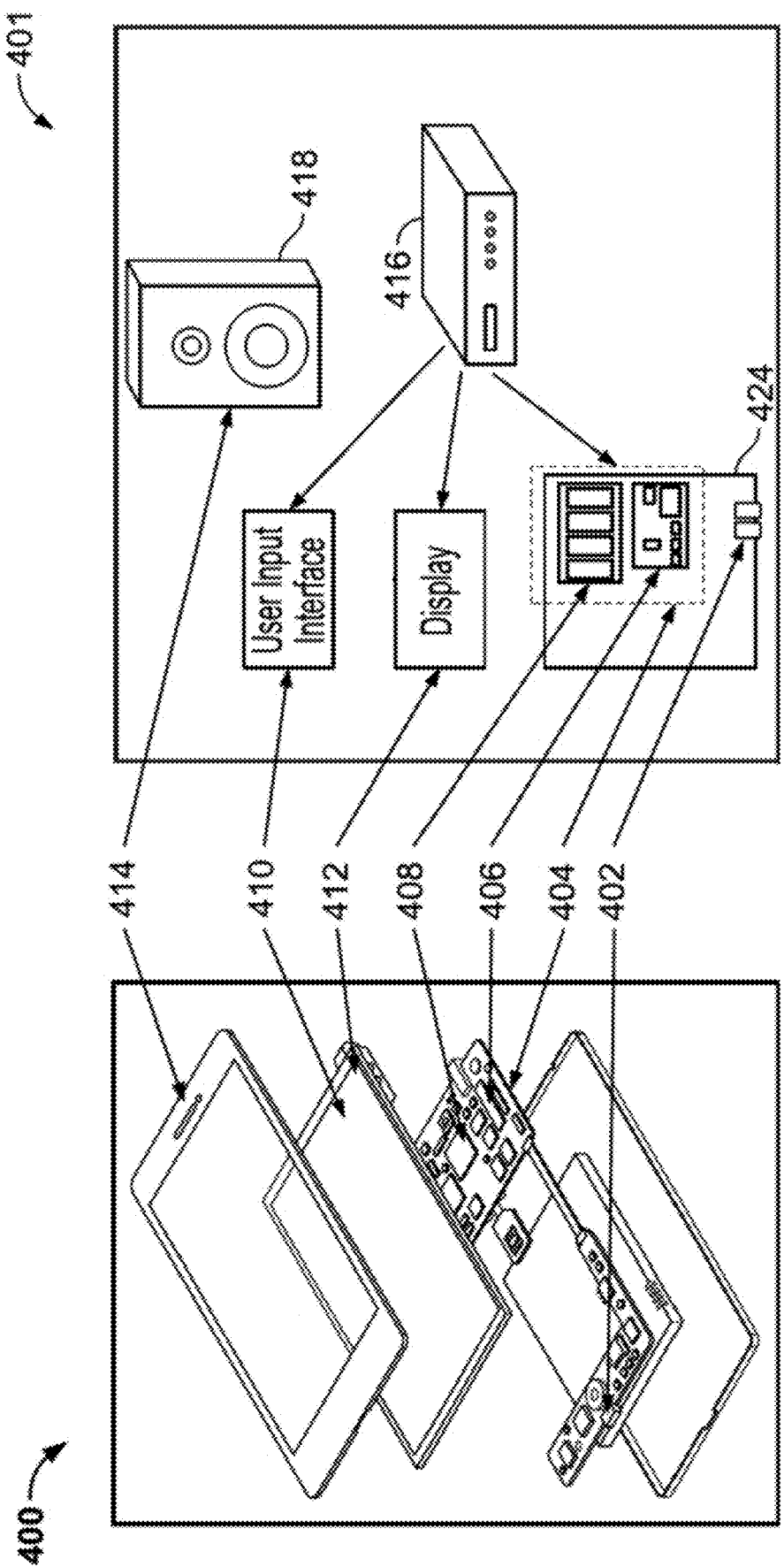
FIG. 4 is a block diagram of an illustrative user equipment, in accordance with some embodiments of the present disclosure.

FIG. 4 shows a generalized embodiment of illustrative media devices 400 and 401. As depicted, media device 400 may be a smartphone or tablet, whereas media device 401 may be a home media system that includes equipment device 416 (e.g., a set-top box, CPU, video-game console, etc.) powered by processor 424. Media devices 400 and 401 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for excluding or verifying video content items based on settings stored in memory (i.e., storage 408).

In client-server based embodiments, control circuitry 404 may include communications circuitry suitable for communicating with a video content server or other networks or servers. The instructions for carrying out the above-mentioned functionality may be stored on a server. Communications circuitry may include an integrated services digital network (ISDN) modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of media devices, or communication of media devices in locations remote from each other.

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the media device to receive and to display, to play, or to record content. The tuning and encoding circuitry may also be used to receive guidance data. The circuitry described herein, including for example, the tuning, audio generating, encoding, decoding, encrypting, decrypting, scaler, and analog/digital circuitry, may be implemented using software running on one or more general purpose or specialized processors. Multiple tuners may be provided to handle simultaneous tuning functions. If storage 408 is provided as a separate device from user equipment 400, the tuning and encoding circuitry (including multiple tuners) may be associated with storage 408.

A user may send instructions to control circuitry 404 using user input interface 410 of media device 400 or user input interface 420 of media device 401. User input interface 410 and user input interface 420 may be any suitable user interface, such as a remote control, mouse, trackball, keypad, keyboard, touch screen, touchpad, stylus input, joystick, voice recognition interface, or other user input interfaces. Display 410 may be a touchscreen or touch-sensitive display. In such circumstances, user input interface 410 may be integrated with or combined with display 412. Display 422 may be provided as a stand-alone device or integrated with other elements of media device 401. Speakers 414 may be provided as integrated with other elements of media device 400. In the case of media device 401, speakers 418 may be stand-alone units (e.g., smart speakers). The audio component of videos and other content displayed on display 422 may be played through speakers 418. In some embodiments, the audio may be distributed to a receiver (not shown), which processes and outputs the audio via speakers 418.

The content filtering may be implemented using any suitable architecture. For example, it may be a stand-alone application wholly-implemented on media device 400. The content filtering and/or any instructions for performing any of the embodiments discussed herein may be encoded on computer readable media. Computer readable media includes any media capable of storing data. In some embodiments, the content filtering is a client-server based application. Data for use by a thick or thin client implemented on media device 400 or media device 401 is retrieved on-demand by issuing requests to a server remote to the media device 400 or media device 401, respectively. For example, media device 400 may receive inputs from the user via input interface 410 and transmit those inputs to the remote server for processing and generating the corresponding outputs. The generated output is then transmitted to media device 400 for presentation to the user.

Figure 5:
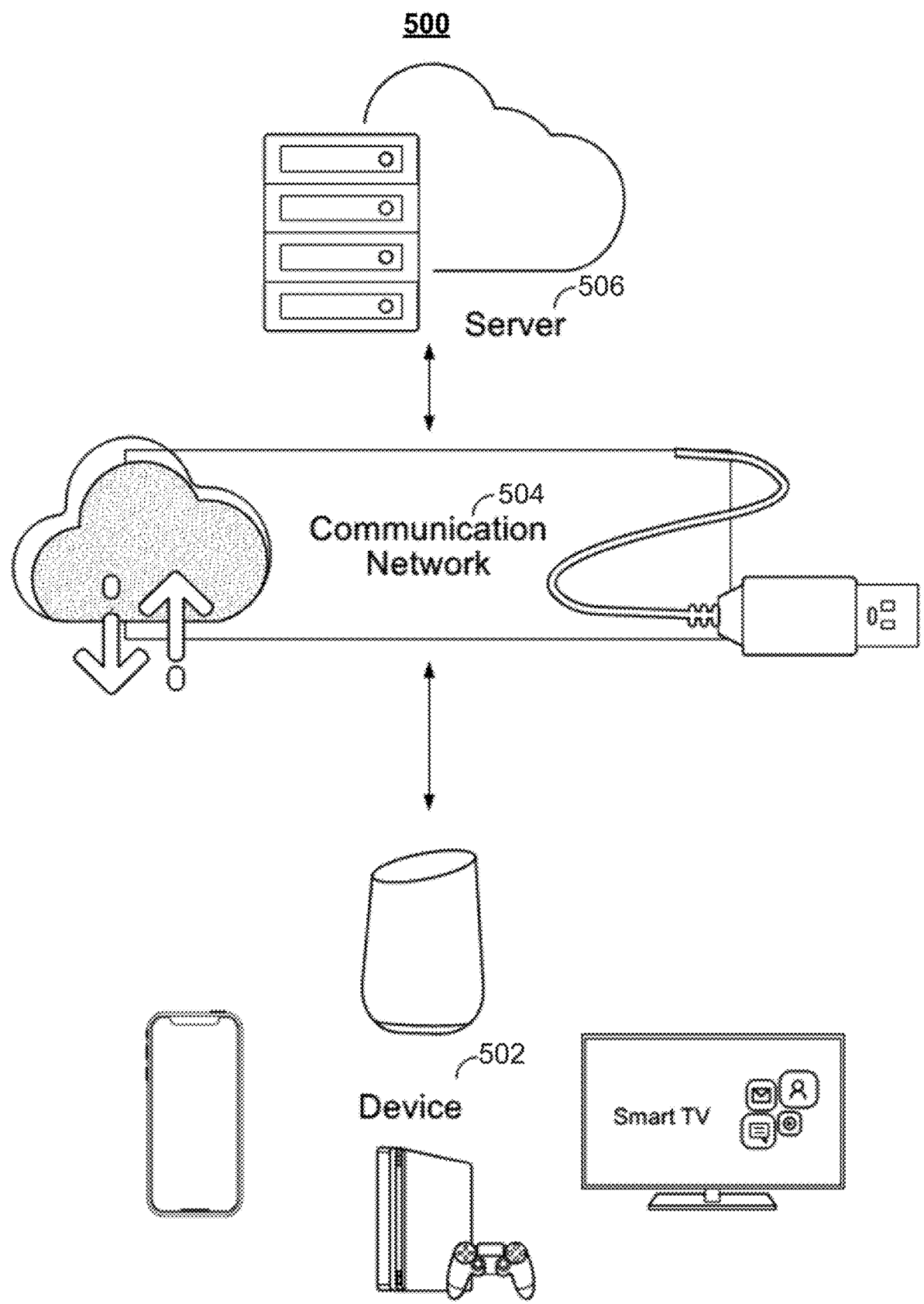
FIG. 5 is a block diagram of an illustrative media system, in accordance with some embodiments of the disclosure.

Media device 400 and media device 401 of FIG. 4 can be implemented in system 500 of FIG. 5 as device 502. Media devices, on which content filtering may be implemented, may function as a standalone device or may be part of a network of devices. Various network configurations of devices may be implemented and are discussed in more detail below.

In system 500, there may be multiple media devices but only one of each is shown in FIG. 5 to avoid overcomplicating the drawing. In addition, each user may utilize more than one type of media device and also more than one of each type of media device.

Device 502 may be coupled to communication network 504. Communication network 504 may be one or more networks including the Internet, a mobile phone network, mobile voice or data network (e.g., a 4G or LTE network), cable network, public switched telephone network, or other types of communications network or combinations of communications networks. Server 506, a processing server, and device 502 may be connected to communication path 504 via one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Although communications paths are not drawn between device 502, server 506 and a processing server, these devices may communicate directly with each other via communication paths, such as short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The media devices may also communicate with each other directly through an indirect path via communication network 504.

System 500 includes server 506 coupled to communication network 504. There may be more than one of server 506, but only one is shown in FIG. 5 to avoid overcomplicating the drawing. Server 506 may include one or more types of content distribution equipment including a television distribution facility, cable system headend, satellite distribution facility, programming sources (e.g., television broadcasters, etc.), intermediate distribution facilities and/or servers, Internet providers, on-demand media servers, and other content providers. Server 506 may be the originator of content (e.g., a television broadcaster, a Webcast provider, etc.) or may not be the originator of content (e.g., an on-demand content provider, an Internet provider of content of broadcast programs for downloading, etc.). Server 506 may include cable sources, satellite providers, on-demand providers, Internet providers, over-the-top content providers, or other providers of content. Server 506 may also include a remote media server used to store different types of content (including video content selected by a user), in a location remote from any of the media devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety. Server 506 may also provide metadata.

Content filtering may be, for example, stand-alone applications implemented on media devices. For example, the content filtering may be implemented as software or a set of executable instructions which may be stored in storage 408, and executed by control circuitry 404 of a device 502. In some embodiments, content filtering may be a client-server application where only a client application resides on the media device, and server application resides on a processing server. For example, content filtering may be implemented partially as a client application on control circuitry 404 of device 502 and partially on a processing server as a server application running on control circuitry of a processing server. When executed by control circuitry of a processing server, the content filtering system may instruct the control circuitry to generate the content filtering output (e.g., results list indicating verified and/or misleading content) and transmit the generated output to device 502. The server application may instruct the control circuitry of the server 506 to transmit metadata for storage on device 502. The client application may instruct control circuitry of the receiving device 502 to generate the content filtering output.

Device 502 may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." Cloud resources may be accessed by device 502 using, for example, a web browser, a desktop application, a mobile application, and/or any combination of access applications of the same. Device 502 may be a cloud client that relies on cloud computing for application delivery, or the media device may have some functionality without access to cloud resources. For example, some applications running on device 502 may be cloud applications, i.e., applications delivered as a service over the Internet, while other applications may be stored and run on the media device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, media devices can use cloud resources for processing operations such as the processing operations performed by processing circuitry described in relation to FIG. 4. Further details of the present disclosure are discussed below in connection with the flowcharts of FIGS. 6 and 7.

Figure 6:
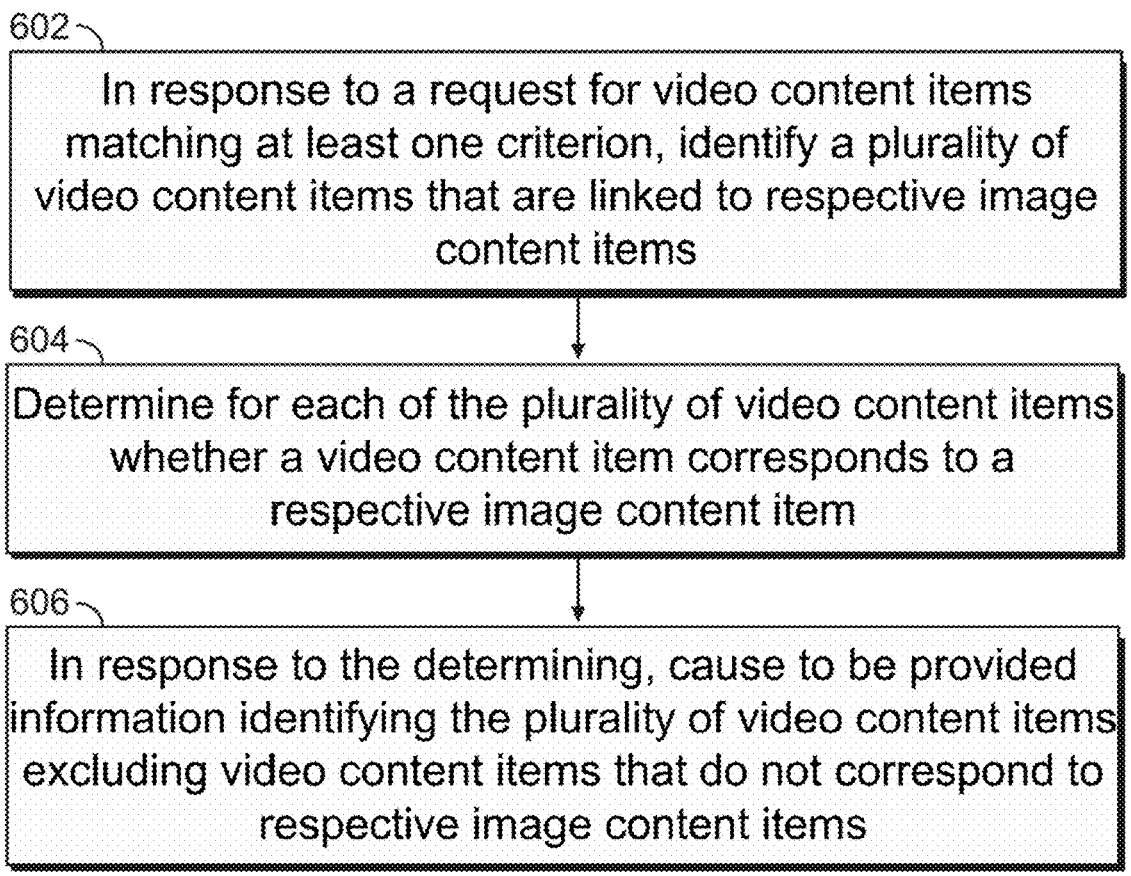
FIG. 6 is a flowchart of an illustrative process for excluding video content items which do not correspond to respective image content items, in accordance with some embodiments of the disclosure.

FIG. 6 is a flowchart of an illustrative process 600 for excluding video content items which do not correspond to respective image content items, in accordance with some embodiments of the disclosure. As shown in FIG. 6, process 600 identifies video content items which are linked to respective image content items. Process 600 determines, for each video content item, whether a respective image content item corresponds to the video content item. Process 600 then excludes each video content item not corresponding to a respective image content item from the video content items.

At step 602, in response to a request for video content items matching at least one criterion, process 600 identifies a plurality of video content items that are linked to respective image content items. In some embodiments, the at least one criterion may be a received search query. For example, the search query may be a voice or text input. Process 600 may perform speech to text processing on voice inputs before further processing the input. In some embodiments, the control circuitry 404 may receive the search query via user input interface 410. In some embodiments, the at least one criterion may be recommendation parameters (e.g., in storage 408), advertising parameters, another type of parameter, or any combination thereof. The respective image content items to which the video content items are linked may be representative images, embedded images, thumbnails, textual descriptions, animations, URLs, any other suitable content that is seemingly descriptive of the underlying video content, or any combination thereof. The video content item may be linked to the respective image content item via metadata, tags, or hyperlink, by being stored in the same location as the video content item, by being embedded in the display of the video content item, by any other method of linking, or any suitable combination thereof.

At step 604, process 600 determines, for each of the plurality of video content items, whether a video content item corresponds to a respective image content item. Process 600 may use a number of requirements when determining whether an image content item corresponds to a video content item. For example, process 600 may require that the image content item must include at least a portion of a frame of the video content item. In some embodiments, process 600 may require that the image content item must include the same subject as the video content item. In some embodiments, process 600 may require that each object in the image content item must appear in the same frame of the video content item. In some embodiments, process 600 may simply require that the image content item and video content item include related subject matter. In some embodiments, process 600 may allow the user to specify the required correspondence between the image content item and video content item.

At step 606, in response to determining whether each video content item corresponds to a respective image content item, process 600 causes to be provided information identifying the plurality of video content items excluding video content items that do not correspond to respective image content items. In some embodiments, process 600 may present video content items that do not correspond to respective image content items in a manner that indicates that the image content items are misleading. For example, in some embodiments the video content items not corresponding to respective image content items are shown grayed out or translucent relative to the legitimate results. In some embodiments, the video content items not corresponding to respective image content items are presented with an indicator that indicate the questionable nature of the underlying video whereas the legitimate results are not presented with such an indicator. In some embodiments, process 600 may generate for display a pop-up, notification, or alert to indicate that a video content item has been excluded from the results list. In some embodiments, process 600 may simply exclude the video content item from the results list.

It will be understood that process 600 is merely illustrative and that various modifications can be made in accordance with the present disclosure.

Figure 7:
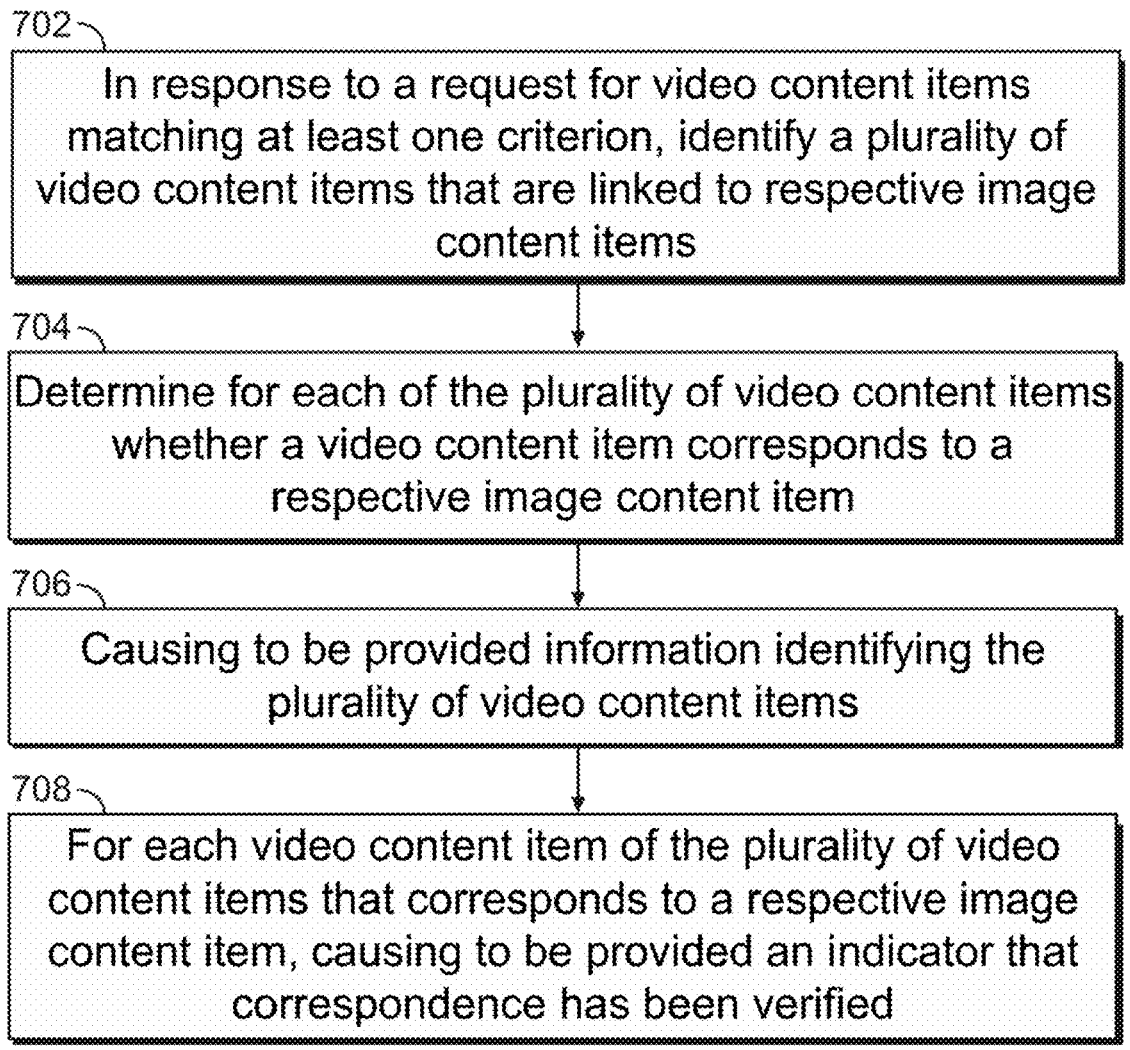
FIG. 7 is a flowchart of an illustrative process for verifying video content items which correspond to respective image content items, in accordance with some embodiments of the present disclosure.

FIG. 7 is a flowchart of an illustrative process 700 for verifying video content items which correspond to respective image content items, in accordance with some embodiments of the present disclosure. As shown in FIG. 7, process 700 identifies video content items which are linked to respective image content items. Process 700 determines, for each video content item, whether a respective image content item corresponds to the video content item. Process 700 then causes to be provided an indicator that correspondence has been verified.

At step 702, in response to a request for video content items matching at least one criterion, process 700 identifies a plurality of video content items that are linked to respective image content items. In some embodiments, the at least one criterion may be a received search query. For example, the search query may be a voice or text input. Process 700 may perform speech to text processing on voice inputs before further processing the input. In some embodiments, the control circuitry 404 may receive the search query via user input interface 410. In some embodiments, the at least one criterion may be recommendation parameters (e.g., in storage 408), advertising parameters, another type of parameter, or any combination thereof. The respective image content items to which the video content items are linked may be representative images, embedded images, thumbnails, textual descriptions, animations, URLs, any other suitable content that is seemingly descriptive of the underlying video content, or any combination thereof. The video content item may be linked to the respective image content item via metadata, tags, or hyperlink, by being stored in the same location as the video content item, by being embedded in the display of the video content item, by any other method of linking, or any suitable combination thereof.

At step 704, process 700 determines, for each of the plurality of video content items, whether a video content item corresponds to a respective image content item. Process 700 may use a number of requirements when determining whether an image content item corresponds to a video content item. For example, process 700 may require that the image content item must include at least a portion of a frame of the video content item. In some embodiments, process 700 may require that the image content item must include the same subject as the video content item. In some embodiments, process 700 may require that each object in the image content item must appear in the same frame of the video content item. In some embodiments, process 700 may simply require that the image content item and video content item include related subject matter. In some embodiments, process 700 may allow the user to specify the required correspondence between the image content item and video content item.

At step 706, process 700 causes to be provided information identifying the plurality of video content items. For example, process 700 may display the information in a content list, display the video content items in a content list, display the respective image content items in a content list, output the information via audio output, output the information in any other suitable manner, or any combination thereof.

At step 708, for each video content item that corresponds to a respective image content item, process 700 may cause to be provided an indicator that correspondence has been verified. In some embodiments, the indicator may be an icon, notification, label, change in appearance of the information identifying the video content item, another indication of verification, or any combination thereof. In some embodiments, the system may include information indicating that the video content items not corresponding to the respective image content items have failed a verification. In some embodiments, legitimate results may be presented with respective visual indicators such as an icon that indicate the thumbnail image corresponds to the underlying video content, whereas misleading results are not presented with such an indicator.

It will be understood that process 700 is merely illustrative and that various modifications can be made in accordance with the present disclosure.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A computer-implemented method for filtering video content items comprising:
   receiving a request for a content item matching a criterion;
   identifying a preview image linked to the content item;
   determining whether the preview image corresponds to the content item based on determining whether the content item and the preview image depict related subject matter and by comparing a subject of the content item with a subject of the preview image using semantic processing;
   based on the determining that the preview image corresponds to the content item by determining that the content item and the preview image depict related subject matter and the subject of the content item matches the subject of the preview image using semantic processing, causing to be provided information identifying the content item as verified; and
   based on the determining that the preview image does not correspond to the content item by determining that the content item and the preview image do not depict related subject matter and the subject of the content item does not match the subject of the preview image using semantic processing, preventing the content item and the preview image from being provided for display.

2. The method of claim 1, wherein the determining whether the preview image corresponds to the content item comprises determining whether the content item and the preview image both depict a particular subject.

3. The method of claim 2, wherein the determining whether the content item and the preview image both depict the particular subject comprises determining that each object in the preview image appears in a frame of the content item.

4. The method of claim 1, wherein the determining whether the preview image corresponds to the content item comprises determining whether the preview image comprises at least a portion of a frame of the content item.

5. The method of claim 4, wherein the determining whether the preview image comprises at least the portion of the frame of the content item comprises determining that the preview image is an exact match to the frame of the content item.

6. The method of claim 1, wherein the comparing the subject of the content item with the subject of the preview image further comprises using at least one of object recognition, machine vision, audio processing, metadata, or embedded data.

7. The method of claim 1, comprising:
   in response to the determining that the preview image does not correspond to the content item, in addition to the preventing of the content item and the preview image from being provided for display, causing to be provided an indication that the content item has been excluded.

8. The method of claim 1, wherein the preview image comprises the at least one of a representative image, an embedded image, a textual description, an animation, or a URL.

9. A system for filtering video content items comprising:
   circuitry configured to:
   receive to a request for a content item matching a criterion;
   identify a preview image linked to the content item;
   determine whether the preview image corresponds to the content item based on determining whether the content item and the preview image depict related subject matter and by comparing a subject of the content item with a subject of the preview image using semantic processing;
   based on the determining that the preview image corresponds to the content item by determining that the content item and the preview image depict related subject matter and the subject of the content item matches the subject of the preview image using semantic processing, cause to be provided information identifying the content item as verified; and
   based on the determining that the preview image does not correspond to the content item by determining that the content item and the preview image do not depict related subject matter and the subject of the content item does not match the subject of the preview image using semantic processing, prevent the content item and the preview image from being provided for display.

10. The system of claim 9, wherein the circuitry configured to determine whether the preview image corresponds to the content item is configured to determine whether the content item and the preview image both depict a particular subject.

11. The system of claim 10, wherein the circuitry configured to determine whether the content item and the preview image both depict the particular subject is configured to determine that each object in the preview image appears in a frame of the content item.

12. The system of claim 9, wherein the circuitry configured to determine whether the preview image corresponds to the content item is configured to determine whether the preview image comprises at least a portion of a frame of the content item.

13. The system of claim 12, wherein the circuitry configured to determine whether the preview image comprises at least the portion of the frame of the content item is configured to determine that the preview image is an exact match to the frame of the content item.

14. The system of claim 9, wherein the circuitry configured to compare the subject of the content item with the subject of the preview image is further configured to use at least one of object recognition, machine vision, audio processing, metadata, or embedded data.

15. The system of claim 9, wherein the circuitry is configured to:
  in response to the determining that the preview image does not correspond to the content item, in addition to the preventing of the content item and the preview image from being provided for display, cause to be provided an indication that the content item has been excluded.

16. The system of claim 9, wherein the preview image comprises the at least one of a representative image, an embedded image, a textual description, an animation, or a URL.

* * * * *